Aug. 12, 1930.  J. C. READ  1,773,008
VAPOR ELECTRIC RECTIFIER
Filed Jan. 18, 1929
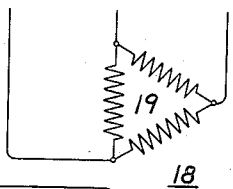
Fig.1
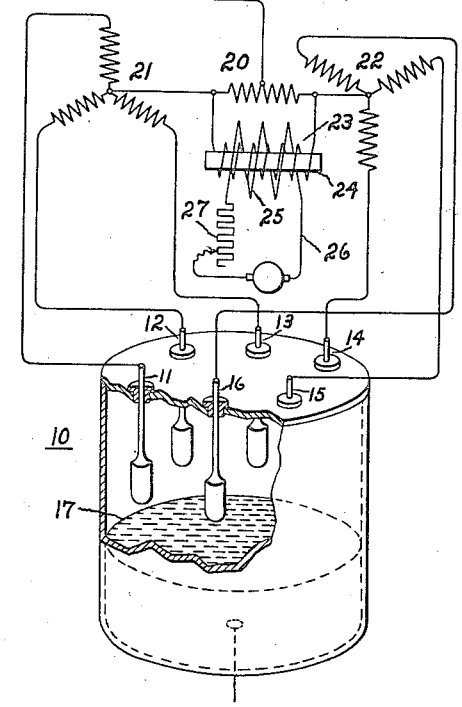
Fig. 2
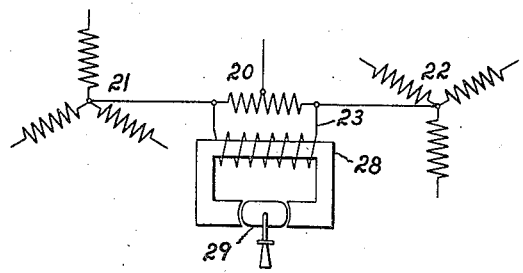
Inventor:
John C. Read,
by Charles E. Tullar
His Attorney.

Patented Aug. 12, 1930

1,773,008

UNITED STATES PATENT OFFICE

JOHN C. READ, OF RUGBY, ENGLAND, ASSIGNOR TO GENERAL ELECTRIC COMPANY, A CORPORATION OF NEW YORK

VAPOR-ELECTRIC RECTIFIER

Application filed January 18, 1929, Serial No. 333,260, and in Great Britain February 16, 1928.

This invention relates to vapor electric devices such as mercury arc rectifiers, and its principal object is to provide an improved method of compounding or varying the direct current voltage.

It is known that a variation of the direct current voltage of a rectifier can be caused by varying the reactance of the interphase transformer by superimposing a direct current excitation on it so as to saturate its core. The object of the present invention is to provide an improved method of varying the direct current voltage.

This invention consists in connecting in parallel with the interphase transformer whose neutral point forms the negative pole of the direct current systems, a reactor whose reactance can be varied down to a low value, so that in the limiting case it can practically short circuit the interphase transformer.

In carrying this invention into effect the reactor is connected across the outer terminals of the interphase transformer only, so that it does not carry any part of the direct current component of the current in the interphase transformer; that is, the piece of apparatus whose reactance has to be varied is smaller than in arrangements hitherto known.

The reactance of the circuit which is thus connected in parallel with the interphase transformer may be varied either by saturating its core, or by moving part of its core, and the variation may be effected either by hand or automatically.

This method of short circuiting or partially short circuiting the interphase transformer may be applied not only to interphase transformers but also to any of the forms of reactance coils which have been proposed or used for variation of the direct current voltage, in which the reactance heretofore has been varied by direct current excitation to saturate the core.

My invention will be better understood from the following description when considered in connection with the accompanying drawing and its scope will be pointed out in the appended claims.

In the accompanying drawing, Fig. 1 illustrates a mercury arc rectifier system in which the direct current voltage is regulated in accordance with my invention, and Fig. 2 illustrates a modification thereof.

Referring to the drawing in detail, Fig. 1 illustrates a mercury arc rectifier 10 provided with anodes 11 to 16, and a cathode 17. The anodes are connected to the secondary of a transformer 18 which is provided with a primary winding 19. An interphase transformer 20 is connected between neutral points 21 and 22 of the secondary winding which is arranged in two Y-connected groups, the end terminals of which are respectively connected to the anodes.

In accordance with my invention, a reactor 23 provided with an iron core 24 is connected in parallel to the interphase transformer 20. A second coil 25 connected to a source 26 in series with a variable resistor 27 is arranged to regulate the saturation of the iron core 24 and thereby the reactance of the coil 23.

Fig. 2 illustrates a modification of my invention in which the reactor 23 is provided with a core 28. This core is of the closed magnetic circuit type and is provided with an adjustable portion whereby the reluctance of the core and thereby the reactance of the coil may be regulated.

What I claim as new and desire to secure by Letters Patent of the United States is:

1. The combination of polyphase windings, a direct current circuit, a rectifier and an interphase transformer connected between said windings and said circuit, and means including a reactor provided with a core and connected in parallel with said interphase transformer for varying the relation between the voltages of said circuit and said windings.

2. The combination of polyphase windings, a direct current circuit, a rectifier and an interphase transformer connected between said windings and said circuit, a reactor provided with a core and connected in parallel with said interphase transformer, and means for varying the saturation of said core.

3. The combination of polyphase windings, a direct current circuit, a vapor electric device and an interphase transformer connected between said windings and said circuit, a reactor provided with an iron core and connected in parallel with said interphase transformer, and means for varying the magnetic reluctance of said core.

4. The combination of polyphase windings, a direct current circuit, a mercury arc rectifier and an interphase transformer connected between said windings and said circuit, a reactor provided with core members movable with respect to one another and connected in parallel with said interphase transformer, and means for moving one of said members.

In witness whereof, I have hereunto set my hand, this 1st day of January, 1929.

JOHN C. READ.